(12) United States Patent
Chiu et al.

(10) Patent No.: US 7,207,685 B2
(45) Date of Patent: Apr. 24, 2007

(54) REFLECTOR MODULE WITH IMAGE CORRECTION CAPABILITY

(75) Inventors: Hsien-Kuang Chiu, Hsinchu (TW);
Chien-Yi Chen, Hsinchu (TW);
Shang-Yi Wu, Hsinchu (TW);
Yi-Chang Chen, Hsinchu (TW)

(73) Assignee: Young Optics Inc., Science Park, Hsinchu (TW)

( * ) Notice: Subject to any disclaimer, the term of this patent is extended or adjusted under 35 U.S.C. 154(b) by 0 days.

(21) Appl. No.: 11/253,491

(22) Filed: Oct. 19, 2005

(65) Prior Publication Data
US 2007/0014039 A1    Jan. 18, 2007

(30) Foreign Application Priority Data
Jul. 12, 2005    (TW) .............................. 94123557 A

(51) Int. Cl.
*G02B 5/08*    (2006.01)
(52) U.S. Cl. ........................................ 359/849; 359/224
(58) Field of Classification Search ........ 359/223–226, 359/849
See application file for complete search history.

(56) References Cited

U.S. PATENT DOCUMENTS 6,198,565 B1 *    3/2001    Iseki et al. .................. 359/224

* cited by examiner

*Primary Examiner*—Euncha P. Cherry
(74) *Attorney, Agent, or Firm*—Allston L. Jones

(57) ABSTRACT

A reflector module for a projection system includes a base, a reflecting component provided with a reflecting surface, an axle unit, and at least one actuator. The base has a surrounding wall with a bottom side, and a bottom wall connected to the surrounding wall for closing the bottom side of the surrounding wall. The reflecting component is disposed in the base, and has side edges and an underside surface. The axle unit is disposed on the side edges of the reflecting component, and interconnects the surrounding wall of the base and the reflecting component such that the reflecting component is mounted tiltably in the base about the axle unit. The actuator is mounted between the bottom wall of the base and the underside surface of the reflecting component, and is operable to drive movement of the reflecting component to cause the reflecting surface to oscillate about the axle unit.

10 Claims, 3 Drawing Sheets

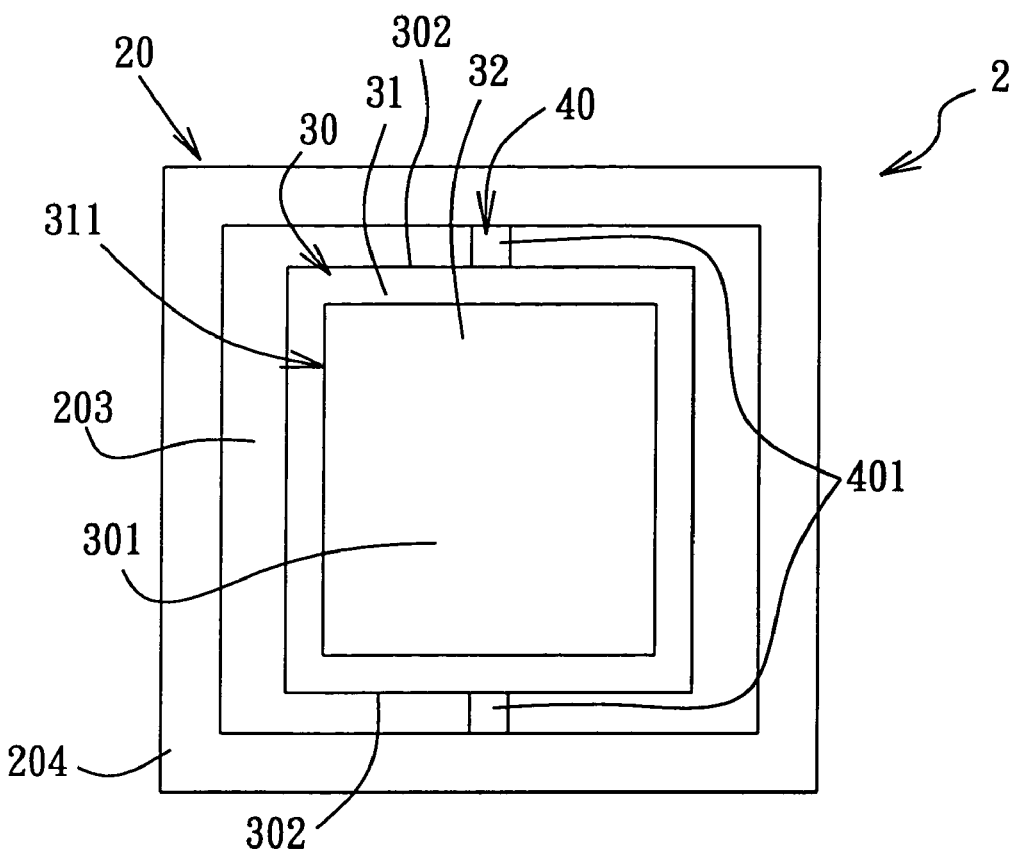
F I G. 7
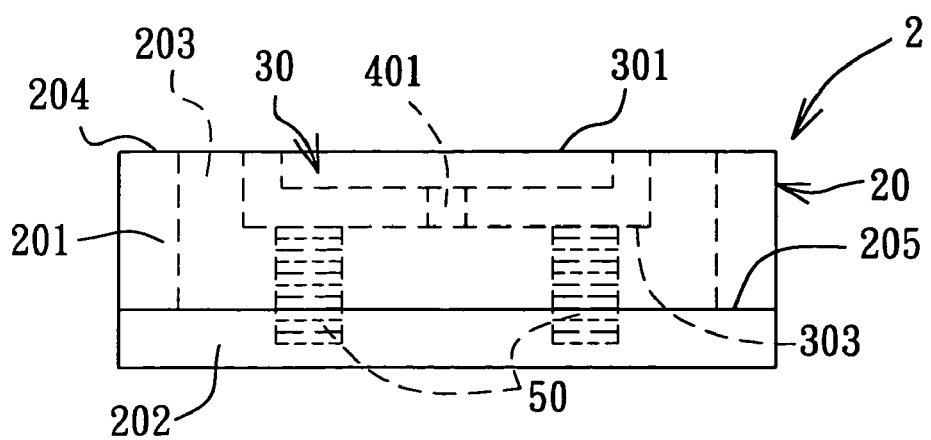
F I G. 8

REFLECTOR MODULE WITH IMAGE CORRECTION CAPABILITY

CROSS-REFERENCE TO RELATED APPLICATION

This application claims priority of Taiwanese Application No. 094123557, filed on Jul. 12, 2005.

BACKGROUND OF THE INVENTION

1. Field of the Invention

The invention relates to a reflector module, more particularly to a reflector module with an image correction capability.

2. Description of the Related Art

The problem of pixellation is normally present in an image projected by a conventional projector since low-resolution images are projected onto a large screen such that individual pixels become apparent to a viewer, thus resulting in jagged edges and poor image quality, as illustrated in FIG. 1.

As shown in FIG. 2, a conventional method for improving the image quality is to mount a conventional reflector module 1 onto an L-shaped projection lens 5. The conventional reflector module 1 is provided with a reflector 12 and is capable of small-amplitude oscillations. Therefore small offsets are introduced in light rays 6 passing through the projection lens 5. Due to the offsets introduced in the light rays 6 and the effect of persistence of vision, individual pixels become less apparent to the viewer, thereby resulting in smoother edges and an improved image quality, as illustrated in FIG. 3.

As shown in FIG. 4 and FIG. 5, the conventional reflector module 1 includes the reflector 12 formed with a reflecting surface 121, a reflector-carrier 13, an actuator 14, a base 15, and a fulcrum unit 16. The reflector 12 is mounted on the reflector-carrier 13, while the reflector-carrier 13 is mounted on the fulcrum unit 16 so as to be tiltable relative to the base 15 about the fulcrum unit 16. The actuator 14 is operable to drive movement of the reflector-carrier 13 for causing the reflector 12 to oscillate about the fulcrum unit 16 with a frequency range of 50~60 Hz. The base 15 has a top surface 151 for mounting of a component, such as the L-shaped projection lens 5 shown in FIG. 2. The fulcrum unit 16 is disposed between and interconnects the reflector-carrier 13 and the base 15, and is generally configured as a hinge (shown in FIG. 5), a bearing, a spring, or a combination of the bearing and the spring (shown in FIG. 6).

Since the reflector-carrier 13 and the base 15 of the conventional reflector module 1 are separate components, cumulative error becomes large after fabrication and assembly. This makes it difficult to achieve a parallel relationship between the reflecting surface 121 of the reflector 12 and the top surface 151 of the base 15 in a motionless state of the reflector carrier 13, which has an adverse effect on the performance of the conventional reflector module 1 in improving the image quality. In addition, the error in each individual component needs to be kept as small as possible in order to keep the cumulative error within a tolerable range, thereby resulting in a difficult fabrication process and higher production costs. Also, assembly and aligning processes become more complex, thus making control over the quality and reliability of the assembled conventional reflector module 1 difficult.

SUMMARY OF THE INVENTION

Therefore, the object of the present invention is to provide a reflector module that is suitable for correcting images projected by a projection system and that is clear of the above drawbacks of the prior art.

According to the present invention, there is provided a reflector module that includes a base, a reflecting component, an axle unit, and at least one actuator. The base has a surrounding wall with a bottom side, and a bottom wall connected to the surrounding wall for closing the bottom side of the surrounding wall. The reflecting component is disposed in the base, and is provided with a reflecting surface. The reflecting component has side edges and an underside surface. The axle unit is disposed on the side edges of the reflecting component, and interconnects the surrounding wall of the base and the reflecting component such that the reflecting component is mounted tiltably in the base about the axle unit. The actuator is disposed in the base, is mounted between the bottom wall of the base and the underside surface of the reflecting component, and is operable to drive movement of the reflecting component for causing the reflecting surface to oscillate about the axle unit.

BRIEF DESCRIPTION OF THE DRAWINGS

Other features and advantages of the present invention will become apparent in the following detailed description of the preferred embodiment with reference to the accompanying drawings, of which:

FIG. 7 is a schematic top view of a reflector module according to one embodiment of the present invention; and FIG. 8 is a schematic side view of the reflector module of FIG. 7.

DETAILED DESCRIPTION OF THE PREFERRED EMBODIMENT

Figure 1:
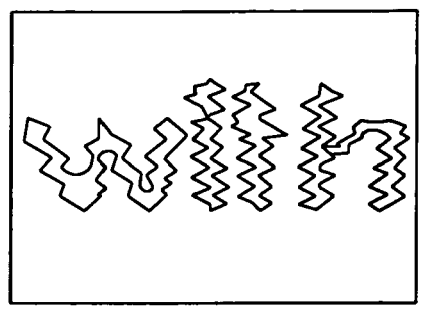
FIG. 1 is a schematic view of an image with pixellation projected by a conventional projector.
Figure 2:
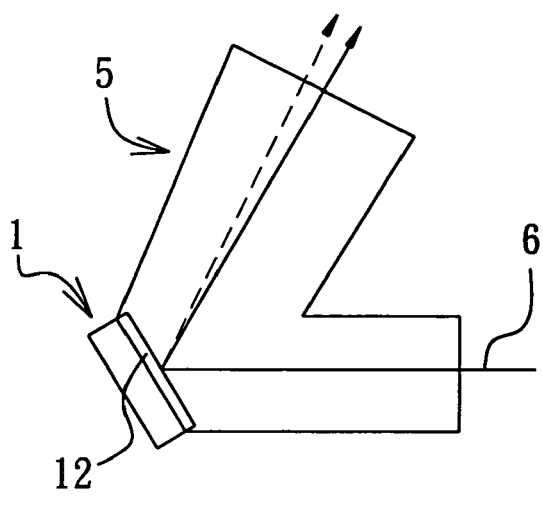
FIG. 2 is a schematic view of a conventional reflector module mounted on an L-shaped projection lens.
Figure 3:
FIG. 3 is a schematic view of an image projected by the conventional projector after undergoing image correction through the conventional reflector module.
Figure 4:
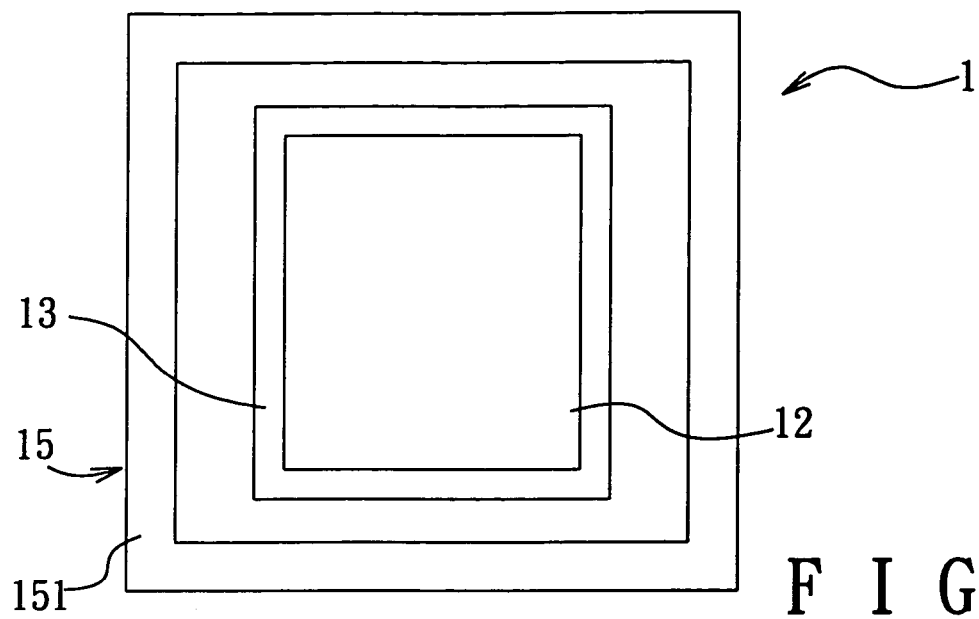
FIG. 4 is a schematic top view of the conventional reflector module.

As shown in FIG. 7 and FIG. 8, the preferred embodiment of a reflector module 2 according to the present invention is adapted for mounting onto a projection lens (not shown) of a projection system (not shown), and includes a base 20, a reflecting component 30, an axle unit 40, and two actuators 50.

The base 20 has a surrounding wall 201 that confines a compartment 203 and that has a bottom side 205, and a bottom wall 202 connected to the surrounding wall 201 for closing the bottom side 205 of the surrounding wall 201. The surrounding wall 201 further has a top side 204 adapted for mounting of the projection lens of the projection system thereon.

The reflecting component 30 is disposed in the compartment 203 in the base 20, and is provided with a reflecting surface 301. The reflecting component 30 has an underside surface 303 and side edges 302. In this embodiment, the reflecting component 30 includes a carrier 31, and a reflector 32 mounted on the carrier 31 and formed with the reflecting surface 301. The carrier 31 is rectangular, and is formed with a reflector-receiving space 311 for receiving the reflector 32 therein. The axle unit 40 is disposed on the side edges 302 of the reflecting component 30, and interconnects the surrounding wall 201 of the base 20 and the side edges 302 of the reflecting component 30 such that the reflecting component 30 is mounted tiltably in the base 20 about the axle unit 40. In this embodiment, the axle unit 40 includes a pair of pivot axles 401 that extend from midpoints of an opposite pair of the side edges 302 of the reflecting component 30 to the surrounding wall 201 of the base 20, respectively, such that the reflecting component 30 has a symmetrical structure relative to the axle unit 40. The pivot axles 401 are configured as rods, and can have rectangular or circular cross sections. Since the feature of the present invention does not reside in the configuration or the shape of the pivot axles 401, the same should not limit the scope of the present invention.

Preferably, the reflecting surface 301 is parallel to the top side 204 of the surrounding wall 201 of the base 20 in a motionless state of the reflecting component 30. While the reflecting surface 301 and the top side 204 are flush with each other in the motionless state of the reflecting component 30 in this embodiment, the present invention is not limited to this particular arrangement.

The actuators 50 are disposed in the compartment 203 in the base 20, and are mounted symmetrically between the bottom wall 202 of the base 20 and the underside surface 303 of the reflecting component 30. The actuators 50 are operable to drive movement of the reflecting component 30 in the base 20 for causing the reflecting surface 301 to high-speed oscillate about the axle unit 40, and for introducing small offsets in light rays (not shown) reflected by the reflecting surface 301 onto a screen (not shown). Due to persistence of vision, individual pixels become less apparent, and image quality is improved accordingly. The actuators 50 are voice coil motors (VCM) or piezoelectric actuators (PZT). It should be noted herein that the number of actuators 50 is not limited to two as in this embodiment; one or more actuators 50 can be used depending on design requirements of a particular application.

The surrounding wall 201 of the base 20, the carrier 31 of the reflecting component 30, and the axle unit 40 are preferably made from the same material, which can be a plastic material or an elastic metal material that is selected from the group consisting of aluminum alloys, magnesium alloys, zinc alloys, and cast iron. In this embodiment, the surrounding wall 201 of the base 20, the carrier 31 of the reflecting component 30, and the axle unit 40 are formed integrally by die-casting. It should be noted herein that the surrounding wall 201, the carrier 31, and the axle unit 40 can be formed integrally using other methods known in the art, such as injection molding.

Figure 5:
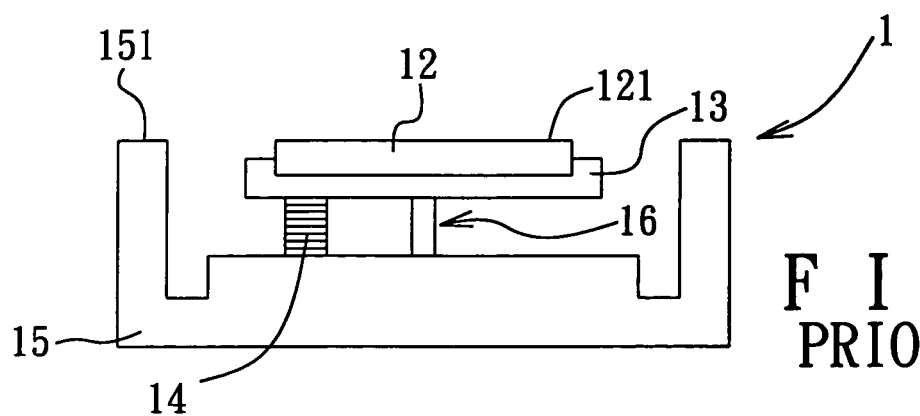
FIG. 5 is a schematic side view of the conventional reflector module with a fulcrum unit configured as a hinge.
Figure 6:
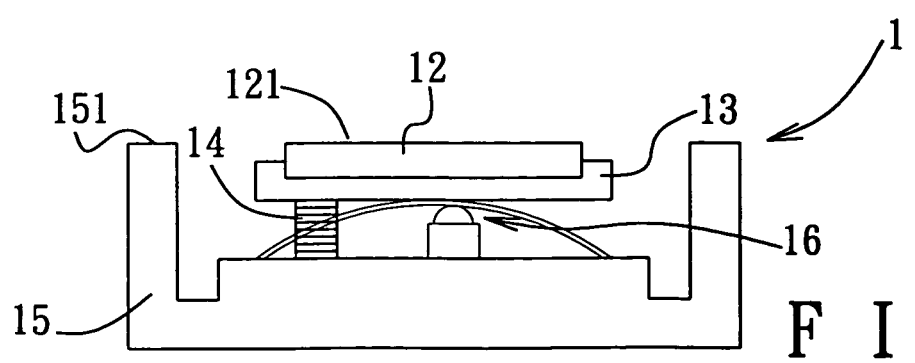
FIG. 6 is a schematic side view of the conventional reflector module with the fulcrum unit configured as a combination of a bearing and a spring.

When the surrounding wall 201, the carrier 31, and the axle unit 40 are formed integrally, self-alignment is ensured, such that the parallel relationship between the reflecting surface 301 of the reflector 32 and the top side 204 of the surrounding wall 201 in the motionless state of the reflecting component 30 is also ensured. In addition, the range of resonant frequency between the pivot axle 401 and the carrier 31 is 100 to 200 Hz. The axle unit 40 has better stability such that the quality and reliability of the reflector module 2 is assured. Moreover, the number of individually formed components is reduced, thereby simplifying the assembly process and reducing the production cost. Therefore, with the axle unit 40 disposed on the side edges 302 of the reflecting component 30 according to the present invention, instead of the fulcrum unit 16 between the reflector carrier 13 and the base 15 (refer to FIG. 5 and FIG. 6), the drawbacks of the conventional reflector module 1 can be overcome.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A reflector module comprising:
    a base having a surrounding wall with a bottom side, and a bottom wall connected to said surrounding wall for closing said bottom side of said surrounding wall;
    a reflecting component disposed in said base and provided with a reflecting surface, said reflecting component having side edges and an underside surface;
    an axle unit disposed on said side edges of said reflecting component, and interconnecting said surrounding wall of said base and said reflecting component such that said reflecting component is mounted tiltably in said base about said axle unit; and
    at least one actuator disposed in said base, mounted between said bottom wall of said base and said underside surface of said reflecting component and operable to drive movement of said reflecting component for causing said reflecting surface to oscillate about said axle unit.

2. The reflector module as claimed in claim 1, wherein said surrounding wall of said base further has a top side that is parallel to said reflecting surface in a motionless state of said reflecting component.

3. The reflector module as claimed in claim 1, wherein said reflecting component includes a carrier, and a reflector mounted on said carrier and formed with said reflecting surface.

4. The reflector module as claimed in claim 3, wherein said surrounding wall of said base, said carrier of said reflecting component, and said axle unit are formed integrally.

5. The reflector module as claimed in claim 4, wherein said surrounding wall of said base, said carrier of said reflecting component, and said axle unit are made from an elastic metal material.

6. The reflector module as claimed in claim 4, wherein said surrounding wall of said base, said carrier of said reflecting component, and said axle unit are made from an plastic material.

7. The reflector module as claimed in claim 1, wherein said axle unit includes a pair of pivot axles that extend from an opposite pair of said side edges of said reflecting component to said surrounding wall of said base, respectively.

8. The reflector module as claimed in claim 1, wherein said actuator is fixed on said bottom wall of said base.

9. The reflector module as claimed in claim 1, wherein said actuator includes a voice coil motor (VCM).

10. The reflector module as claimed in claim 1, wherein said actuator includes a piezoelectric actuator (PZT).

* * * * *